United States Patent
Nakano (10) Patent No.: US 10,538,109 B2
(45) Date of Patent: Jan. 21, 2020

(54) OPTICAL SCANNING DEVICE

(71) Applicant: KYOCERA Document Solutions Inc., Osaka (JP)

(72) Inventor: Issei Nakano, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/073,414

(22) PCT Filed: Jan. 25, 2017

(86) PCT No.: PCT/JP2017/002597
§ 371 (c)(1),
(2) Date: Jul. 27, 2018

(87) PCT Pub. No.: WO2017/131049
PCT Pub. Date: Aug. 3, 2017

(65) Prior Publication Data
US 2019/0039385 A1 Feb. 7, 2019

(30) Foreign Application Priority Data
Jan. 29, 2016 (JP) .................................. 2016-016523

(51) Int. Cl.
*B41J 2/47* (2006.01)
*G03G 15/043* (2006.01)
(Continued)

(52) U.S. Cl.
CPC ................ *B41J 2/47* (2013.01); *G02B 26/12* (2013.01); *G03G 15/043* (2013.01); *G03G 21/14* (2013.01);
(Continued)

(58) Field of Classification Search
CPC .. G02B 26/127; G02B 26/122; G03G 15/043; G03G 15/0415; G03G 15/0435;
(Continued)

(56) References Cited

U.S. PATENT DOCUMENTS 5,636,009 A * 6/1997 Honda ............... G03G 15/0266
399/176
6,566,641 B1 * 5/2003 Suda ......................... G01J 1/32
250/205

(Continued)

FOREIGN PATENT DOCUMENTS

JP 2007-144987 6/2007
JP 2010-076354 4/2010

OTHER PUBLICATIONS

International Search Report dated Mar. 21, 2017 in International (PCT) Application No. PCT/JP2017/002597.

*Primary Examiner* — John Zimmermann
(74) *Attorney, Agent, or Firm* — Wenderoth, Lind & Ponack, L.L.P.

(57) ABSTRACT

A scanning path of light includes a synchronization detection area A where a synchronization detection sensor 47 detects scanning light and an image writing area B where writing of the image data to a photosensitive drum 11 is performed by the scanning light, and a light amount change unit 100 is configured to reduce a change amount of a light amount in the synchronization detection area A as compared with the image writing area B.

2 Claims, 6 Drawing Sheets (51) Int. Cl.
*G03G 21/14* (2006.01)
*H04N 1/113* (2006.01)
*G02B 26/12* (2006.01)
*H04N 1/024* (2006.01)

(52) U.S. Cl.
CPC ......... *H04N 1/02481* (2013.01); *H04N 1/113* (2013.01)

(58) Field of Classification Search
CPC ....... G03G 15/305; G03G 15/326; B41J 2/47; B41J 2/471
See application file for complete search history.

(56) References Cited

U.S. PATENT DOCUMENTS

| | | | |
|---|---|---|---|
| 6,933,957 B2* | 8/2005 | Omori | G03G 15/043 347/249 |
| 7,294,824 B2* | 11/2007 | Maeda | G02B 26/127 250/234 |
| 2001/0028387 A1* | 10/2001 | Maeda | G02B 26/127 347/232 |
| 2005/0206964 A1* | 9/2005 | Hata | H04N 1/4015 358/448 |
| 2007/0019515 A1 | 1/2007 | Kaima | |
| 2011/0318057 A1* | 12/2011 | Watanabe | G02B 26/127 399/151 |
| 2013/0286141 A1* | 10/2013 | Iwamoto | G03G 15/0435 347/224 |
| 2014/0300677 A1* | 10/2014 | Yoshida | G03G 15/0435 347/133 |

* cited by examiner

OPTICAL SCANNING DEVICE

TECHNICAL FIELD

The present invention relates to an optical scanning device.

BACKGROUND ART

In the related art, there has been known an optical scanning device installed at an electrophotographic image forming apparatus. The optical scanning device is configured to emit light corresponding to image data at a predetermining writing timing, thereby exposing a photosensitive drum. The optical scanning device has a light source, a deflector that deflects light emitted from the light source and converts the deflected light into scanning light, an image forming lens that forms an image of the scanning light from the deflector on the photosensitive drum, and a synchronization detection sensor that outputs a signal serving as a reference of the writing timing of the image data. The synchronization detection sensor is provided at a predetermining position of a scanning path of the light. Then, the synchronization detection sensor outputs a synchronization detection signal to a controller when the amount of the light received from the light source is equal to or more than a prescribed threshold value. The controller controls a writing timing to an image to the photosensitive drum on the basis of a reception timing of the synchronization detection signal.

In this type of optical scanning device, a scanning speed of the light by the deflector is changed in accordance with printing conditions such as a printing speed and a resolution. In general, as the scanning speed of the light (a printing speed) by the deflector is fast, the amount of the light emitted from the light source is increased. This optical scanning device has a problem that, when the light amount is changed, light detection accuracy by the synchronization detection sensor is reduced. In this regard, in an optical scanning device disclosed in Patent Literature 1, a threshold value of the synchronization detection sensor is changed in accordance with the amount of light emitted from a light source.

CITATION LIST

Patent Literature

Patent Literature 1: Japanese Unexamined Patent Application Publication No. 2010-76354

SUMMARY OF INVENTION

Technical Problem

However, in the optical scanning device disclosed in the Patent document 1, when the amount of the light emitted from the light source is excessively increased, a synchronization detection sensor detects a large amount of stray light. As a consequence, even though a threshold value of the synchronization detection sensor is changed (increased), since the amount of the stray light exceeds the change amount of the threshold value, the synchronization detection sensor erroneously detects the stray light. In contrast, when the amount of the light emitted from the light source is excessively decreased, even though the threshold value of the synchronization detection sensor is changed (reduced), since the reduced amount of the light amount exceeds the change amount of the threshold value, no synchronization detection signal is outputted from the synchronization detection sensor. As a consequence, there is a problem that it is not possible to appropriately control a writing timing of image data to a photosensitive drum.

The present invention has been made to solve the aforementioned problems, and an object of the present invention is to accurately control a writing start timing of image data to a photosensitive drum by reliably performing synchronization detection by a synchronization detection sensor regardless of a change in the amount of light emitted from a light source.

Solution to Problem

An optical scanning device according to the present invention includes a light source that emits light, a deflector that deflects the light emitted from the light source and allows the deflected light to be scanned on a surface of a photosensitive drum, a synchronization detection sensor provided at a predetermined position of a scanning path of the light deflected by the deflector and outputting a reference signal of a writing start timing of image data to the photosensitive drum, a scanning control unit that controls a scanning speed of the light by the deflector in accordance with a printing condition, and a light amount change unit that changes a light amount of the light source such that the light amount of the light source is increased as the scanning speed of the light by the deflector is high.

The aforementioned scanning path of the light includes a synchronization detection area where the aforementioned synchronization detection sensor detects scanning light and an image writing area where writing of the image data to the photosensitive drum is performed by the scanning light, and the aforementioned light amount change unit is configured to reduce a change amount of the aforementioned light amount in the synchronization detection area as compared with the aforementioned image writing area.

Advantageous Effects of Invention

According to the present invention, it is possible to reliably perform synchronization detection by a synchronization detection sensor regardless of a change in the amount of light emitted from a light source. Accordingly, it is possible to accurately control a writing start timing of image data to a photosensitive drum.

DESCRIPTION OF EMBODIMENTS

Hereinafter, embodiments of the present invention will be described in detail on the basis of the drawings. It is noted that the present invention is not limited to the following embodiments.

Embodiment 1

Figure 1:
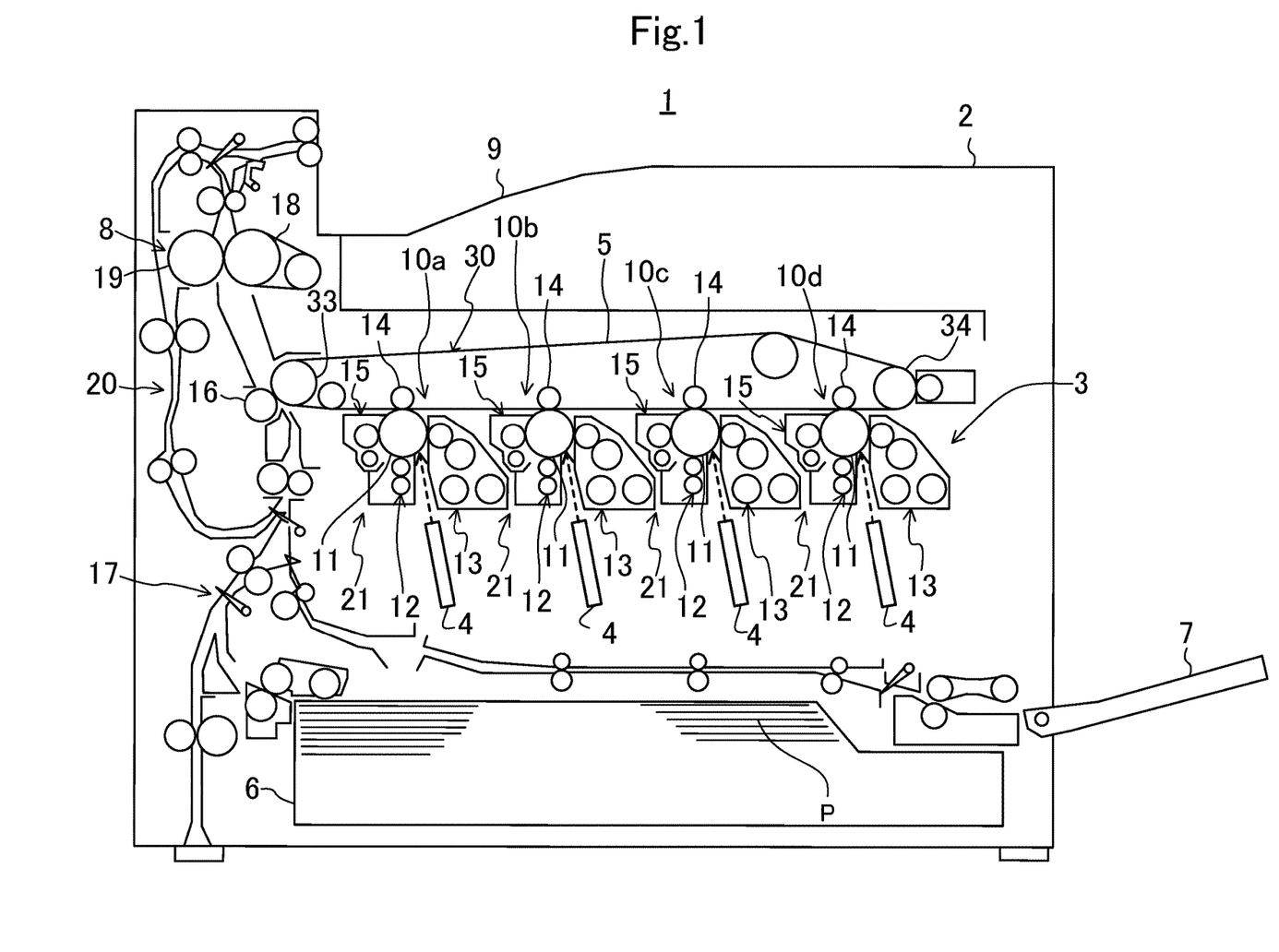
FIG. 1 is a schematic longitudinal sectional view illustrating an image forming apparatus in an embodiment.

FIG. 1 illustrates a schematic configuration diagram of an image forming apparatus 1 according to an embodiment of the invention. The image forming apparatus 1 is a tandem type color printer and includes an image forming unit 3 in a box-like casing 2. The image forming unit 3 transfers an image to a recording paper P and forms the image on the recording paper P on the basis of image data transmitted from an external device such as a computer subjected to network connection and the like. Below the image forming unit 3, four optical scanning devices 4 are arranged to irradiate laser beam, and above the image forming unit 3, an intermediate transfer device 30 having a transfer belt 5 is arranged. Below the four optical scanning devices 4, a paper storage unit 6 is arranged to store the recording paper P, and at the lateral side of the paper storage unit 6, a manual paper feeding unit 7 is arranged. At a lateral upper side of the transfer belt 5, a fixing unit 8 is arranged to perform a fixing process on the image transferred to and formed on the recording paper P. A reference numeral 9 indicates a paper discharge unit arranged at an upper part of the casing 2 to discharge the recording paper P subjected to the fixing process in the fixing unit 8.

The image forming unit 3 includes four image forming units 10a to 10d arranged in a row along the transfer belt 5. The image forming unit 10a forms a black toner image, the image forming unit 10b forms a yellow toner image, the image forming unit 10c forms a magenta toner image, and the image forming unit 10d forms a cyan toner image. Each of the image forming units 10a to 10d has a photosensitive drum 11 serving as an image carrying member. Directly under each photosensitive drum 11, a charging device 12 is arranged, and at one side of each photosensitive drum 11, a developing device 13 is arranged. Directly above each photosensitive drum 11, a primary transfer roller 14 is arranged, and at the other side of each photosensitive drum 11, a cleaning unit (hereinafter, referred to as a cleaning device) 15 is arranged to clean the peripheral surface of the photosensitive drum 11.

The peripheral surface of the aforementioned each photosensitive drum 11 is uniformly charged by the charging device 12, and laser beam corresponding to each color based on the image data inputted from the aforementioned computer and the like is irradiated to the charged peripheral surface of the photosensitive drum 11 from the optical scanning device 4, so that an electrostatic latent image is formed on the peripheral surface of each photosensitive drum 11. Toner serving as a developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller arranged below the fixing unit 8 in the state of abutting the transfer belt 5, wherein the recording paper P conveyed along a paper conveyance path 17 from the paper storage unit 6 or the manual paper feeding unit 7 is interposed between the secondary transfer roller 16 and the transfer belt 5, and the toner images on the transfer belt 5 are transferred to the recording paper P by a transfer bias applied to the secondary transfer roller 16.

The fixing unit 8 includes a heating roller 18 and a pressure roller 19, wherein the recording paper P is interposed by the heating roller 18 and the pressure roller 19 so as to be heated and pressed, so that the toner images, which have been transferred to the recording paper P, are fixed to the recording paper P. The recording paper P subjected to the fixing process is discharged to the paper discharge unit 9. A reference numeral 20 indicates a reversing conveyance path for reversing the recording paper P discharged from the fixing unit 8 at the time of duplex printing.

Figure 2:
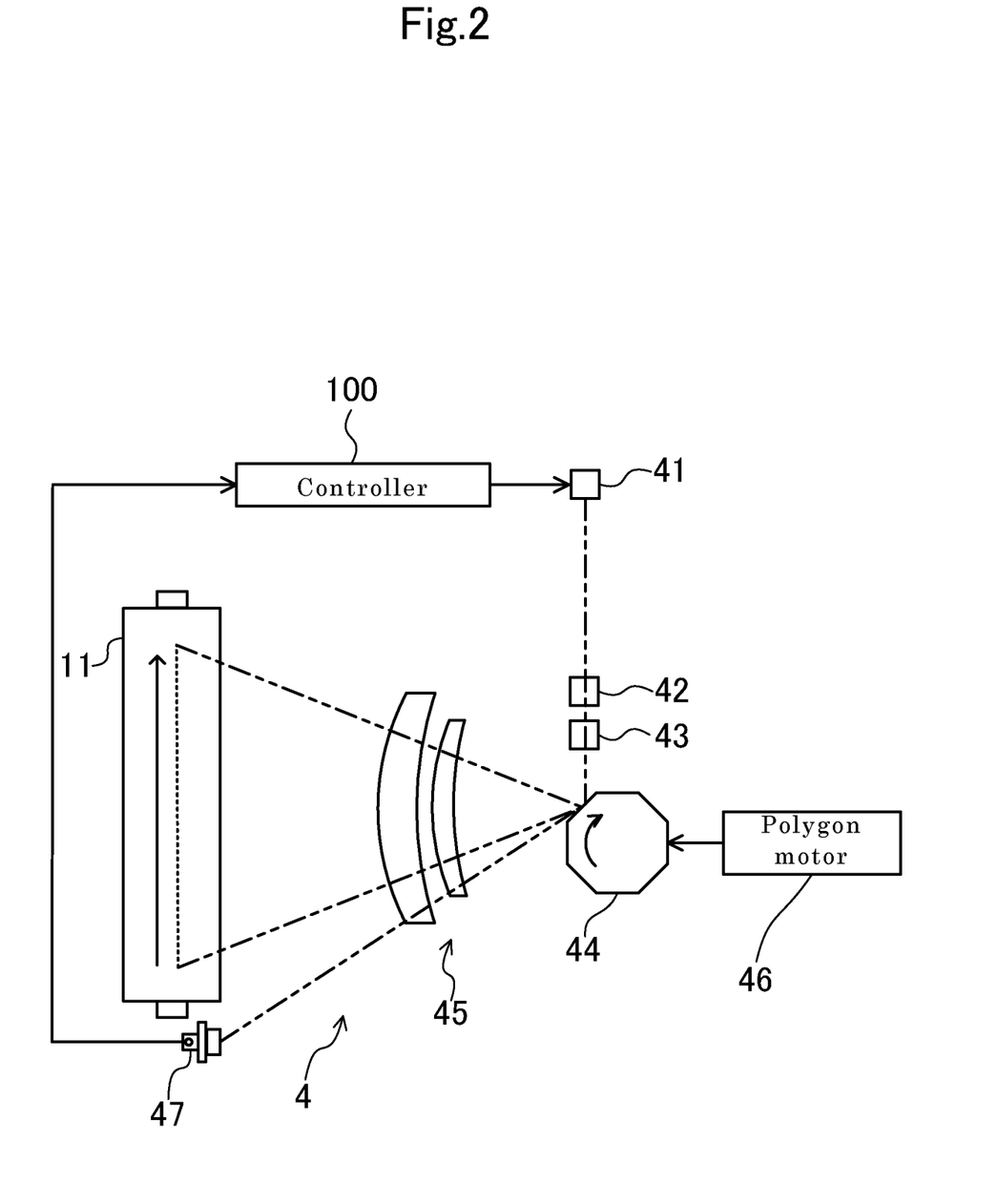
FIG. 2 is a schematic configuration diagram of an optical scanning device.

FIG. 2 is a schematic diagram illustrating an example of an internal configuration of the optical scanning device 4. The configurations of the four optical scanning devices 4 are similar to one another, wherein each optical scanning device 4 is electrically connected to a controller 100. The optical scanning device 4 includes a light source 41, a collimator lens 42, a cylindrical lens 43, a polygon mirror (a rotating polygon mirror) 44, an fθ lens 45, a polygon motor 46, and a beam detect sensor (hereinafter, referred to a BD (beam detect) sensor 47).

The light source 41 has light emitting elements such as laser diodes (LDs) that convert a current signal into light. A driving current for driving the light source 41 (the laser diodes) is supplied by the controller 100. The light source 41 emits light with a light amount corresponding to the driving current supplied by the controller 100. The light (for example, light beam) emitted from the light source 41 is converted into parallel light by the collimator lens 42. The parallel light is reflected by a reflection mirror (not illustrated) toward the polygon mirror 44 and is incident into the polygon mirror 44 being rotated by driving of the polygon motor 46.

The polygon mirror 44 is formed in a polygonal shape (an octagonal shape in the present embodiment) having a plurality of reflection surfaces on a peripheral surface thereof. The polygon mirror 44 is rotationally driven by the polygon motor 46, thereby reflecting the light emitted from the light source 41 with each reflection surface. By so doing, the polygon mirror 44 deflects the light emitted from the light source 41 and allows the light to be scanned in an axis direction (being a main scanning direction, and an up and down direction of FIG. 2) of the photosensitive drum 11.

The fθ lens 45 constitutes a part of an optical system arranged between the polygon mirror 44 and the photosensitive drum 11. The fθ lens 45 performs equal speed conversion for the light reflected by the polygon mirror 44 and forms an image of the converted light on the peripheral surface of the photosensitive drum 11. In this way, charge on the peripheral surface of the photosensitive drum 11 is removed, so that an electrostatic latent image is formed on the peripheral surface of the photosensitive drum 11.

The BD sensor 47, for example, is configured using a photodiode. The BD sensor 47 is used in order to adjust a start timing of light beam scanning (that is, an image writing operation) for image formation. That is, the light reflected by the polygon mirror 44 rotating in a clockwise direction (an arrow direction) of FIG. 2 is incident into the BD sensor 47 by passing through the fθ lens 45. Then, when the amount of the incident light exceeds a preset threshold value of the BD sensor 47, a synchronization detection signal is outputted from the BD sensor 47. The synchronization detection signal outputted from the BD sensor 47 is inputted to the controller 100 and is used to adjust an image writing timing by the light source 41.

Figure 3:
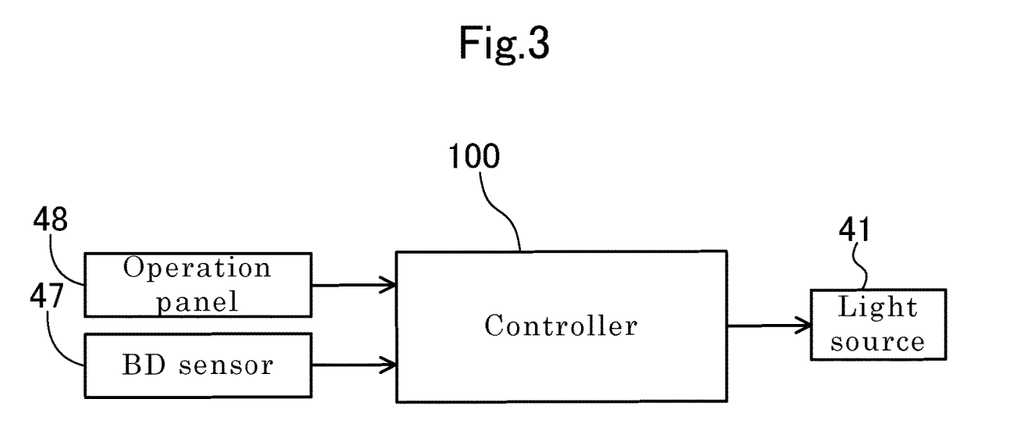
FIG. 3 is a block diagram illustrating a configuration of a light source control system.

FIG. 3 is a block diagram illustrating an example of a configuration of a light source control system. The controller 100 is configured by a microcomputer having a CPU, a ROM, and a RAM. The controller 100 performs operation control of the light source 41 with respect to each optical scanning device 4 on the basis of signals and the like from the BD sensor 47 and an operation panel 48 with respect to each optical scanning device 4.

The controller 100 is connected to the operation panel 48 via an interface circuit. The operation panel 48 has an operation part such as a liquid crystal type touch panel and a push button. A user can set printing conditions such as a printing speed and a resolution by operating the operation part. The operation panel 48 transmits the printing conditions set by the user to the controller 100.

The controller 100 calculates a target scanning speed of light on the basis of the printing conditions received from the operation panel 48, and changes the light amount of the light source 41 with respect to each optical scanning device 4 in accordance with the calculated target scanning speed. Contents of the light amount change control of the light source 41 with respect to each optical scanning device 4 are similar to one another.

Figure 4:
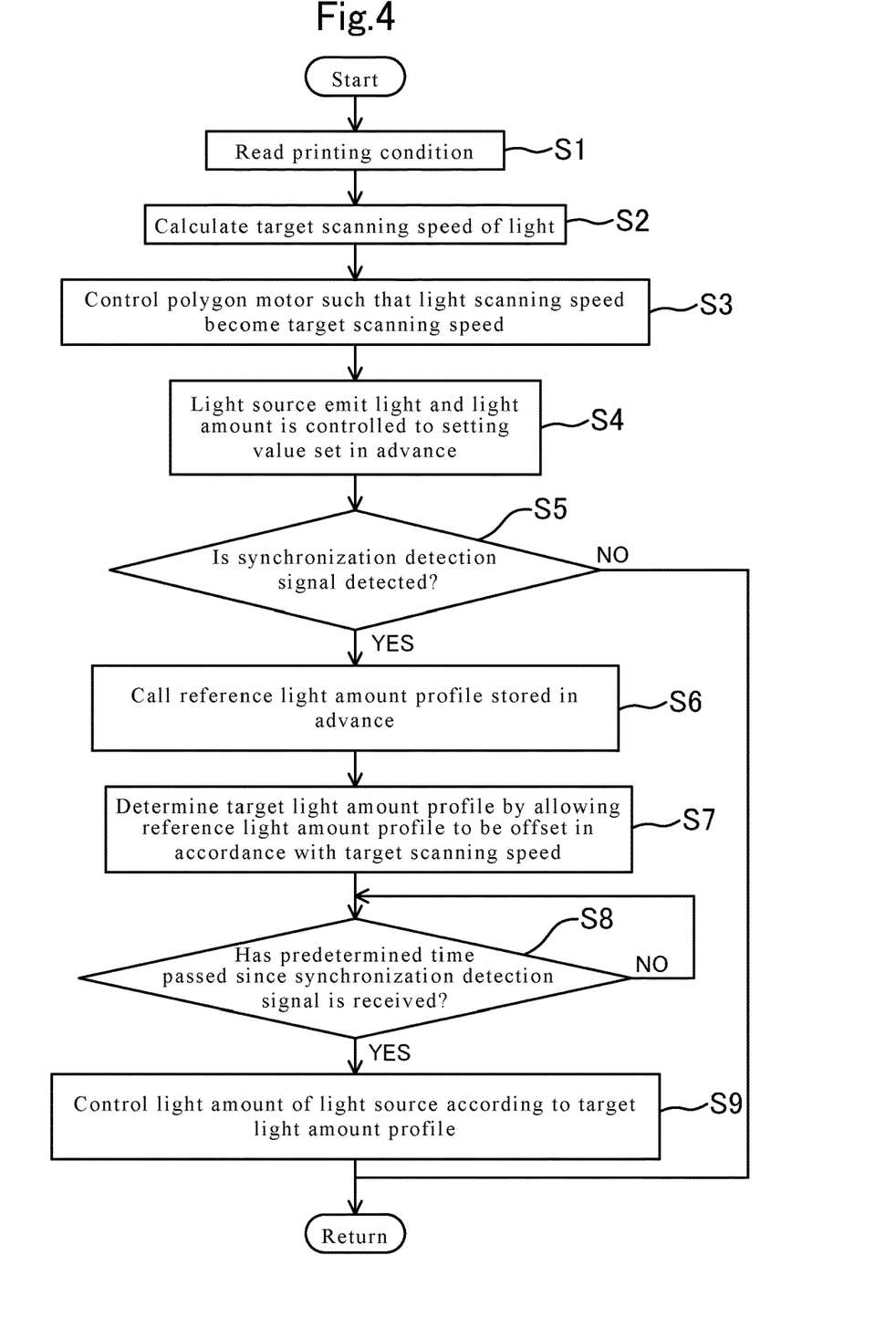
FIG. 4 is a flowchart illustrating contents of light amount change control performed by controller.

FIG. 4 is a flowchart illustrating the contents of the light amount change control performed by the controller 100.

In initial step S1, the controller 100 reads the printing conditions (for example, a printing speed and a resolution) outputted from the operation panel 48.

In step S2, on the basis of the printing speed and the resolution read in step S1, the controller 100 calculates the target scanning speed of light. The target scanning speed is calculated to be fast as the printing speed and the resolution read in step S1 are high.

In step S3, the controller 100 controls a rotation speed of the polygon motor 46 such that the scanning speed of light by the optical scanning device 4 becomes the aforementioned target scanning speed.

In step S4, light emission is started from the light source 41 and the controller 100 controls the light amount of the light source 41 to a setting value A set in advance.

In step S5, the controller 100 determines whether a synchronization detection signal from the BD sensor 47 is detected. When the determination is NO, the controller 100 proceeds to return, and when the determination is YES, the controller 100 proceeds to step S6.

Figure 5:
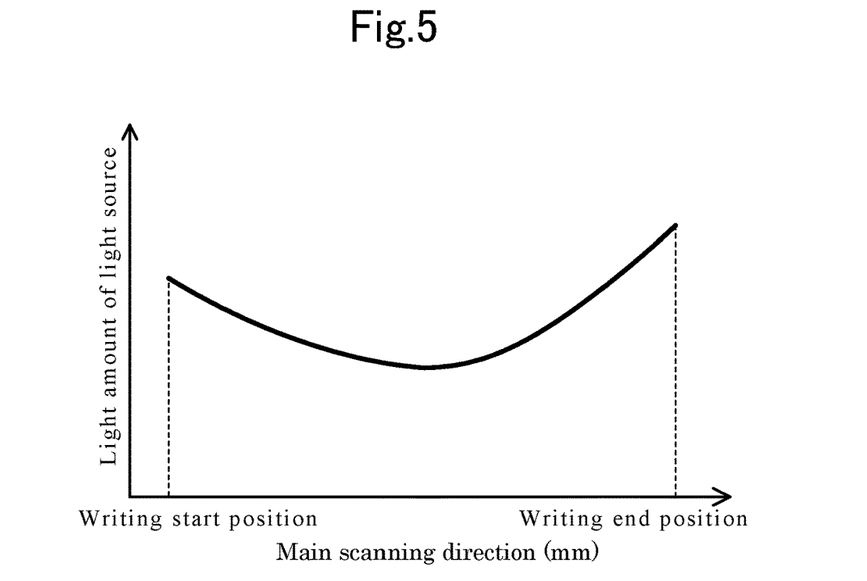
FIG. 5 is a graph illustrating an example of a reference light amount profile.

In step S6, the controller 100 calls a reference light amount profile (see FIG. 5) stored in advance in the ROM of the controller 100. The reference light amount profile is obtained by graphing the light amount of the light source 41 when the scanning speed of light is a reference speed as a function of an exposure position. In the graph, a vertical axis denotes the light amount of the light source and a horizontal axis denotes a position in a main scanning direction of light. In the reference light amount profile, the light amount at both end parts (an end part of a writing start side and an end part of a writing end side of image data) in the main scanning direction is larger than that at the center part. In this way, uneven exposure on the surface of the photosensitive drum 11, which occurs when an incident angle of light incident into the fθ lens 45 differs depending on the position of the main scanning direction, is suppressed.

In step S7, the controller 100 generates a target light amount profile by allowing the reference light amount profile read in step S6 to be offset in the vertical axis direction in accordance with the target scanning speed of light calculated in step S2. The offset amount is large as an absolute value of a difference between the aforementioned reference speed and target scanning speed is large. The offset direction of the reference light amount profile is a plus side when the target scanning speed is higher than the reference speed, and is a minus side when the target scanning speed is lower than the reference speed.

In step S8, the controller 100 determines whether a predetermined time has passed since the synchronization detection signal is received in step S5. When the determination is YES, the controller 100 proceeds to step S9, and when the determination is NO, the controller 100 performs step S8 again.

In step S9, the controller 100 performs writing of the image data to the photosensitive drum 11 while controlling the light amount of the light source 41 according to the target light amount profile determined in step S7. After the writing of the image data is ended, the controller 100 proceeds to return.

Figure 6:
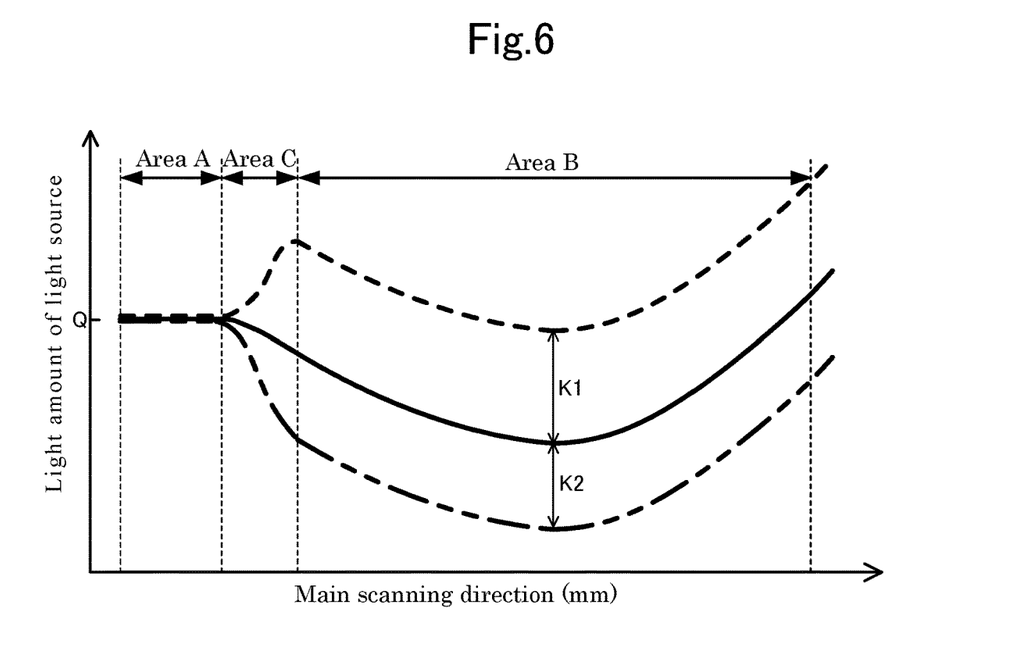
FIG. 6 is a graph illustrating an example of light amount change control in an embodiment 1.

FIG. 6 is a graph schematically illustrating a change in the light amount when the aforementioned light amount change control is performed by the controller 100.

In the graph, a thick solid line illustrates when the target scanning speed of light is the aforementioned reference speed, a thick broken line illustrates when the target scanning speed of light is higher than the aforementioned reference speed, and a thick two dot chain line illustrates when the target scanning speed of light is lower than the aforementioned reference speed.

In the graph, an area A is an area corresponding to a period from when emission of light is started from the light source 41 until when the light is detected by the BD sensor 47, and a synchronization detection signal is outputted from the BD sensor 47 (from when step S4 is started to be performed until when YES is determined in step S5). An area B is an area corresponding to a period (a period from when step S9 is started to be performed until when step S9 is ended) in which writing of image data to the photosensitive drum 11 is performed by the light emitted from the light source 41. An area C is an area corresponding to a period (a period from when YES is determined in step S5 until when step S9 is started to be performed) from when the synchronization detection signal is outputted from the BD sensor 47 until when the writing of the image data to the photosensitive drum 11 is started. Hereinafter, the area A is called a "synchronization detection area", the area B is called an "image writing area", and the area C is called a "transition area".

As apparent from the graph, in the image writing area B, the light amount profile is allowed to be offset to a plus side or a minus side in correspondence with the target scanning speed of light calculated in step S2. Consequently, it is possible to irradiate a constant amount of light to the surface of the photosensitive drum 11 regardless of high and low speeds of the scanning speed of light on the surface of the photosensitive drum 11. Consequently, it is possible to prevent uneven exposure on the surface of the photosensitive drum 11. Accordingly, it is possible to prevent the concentration of a printed image from being varied by a printing speed and a resolution.

Figure 8:
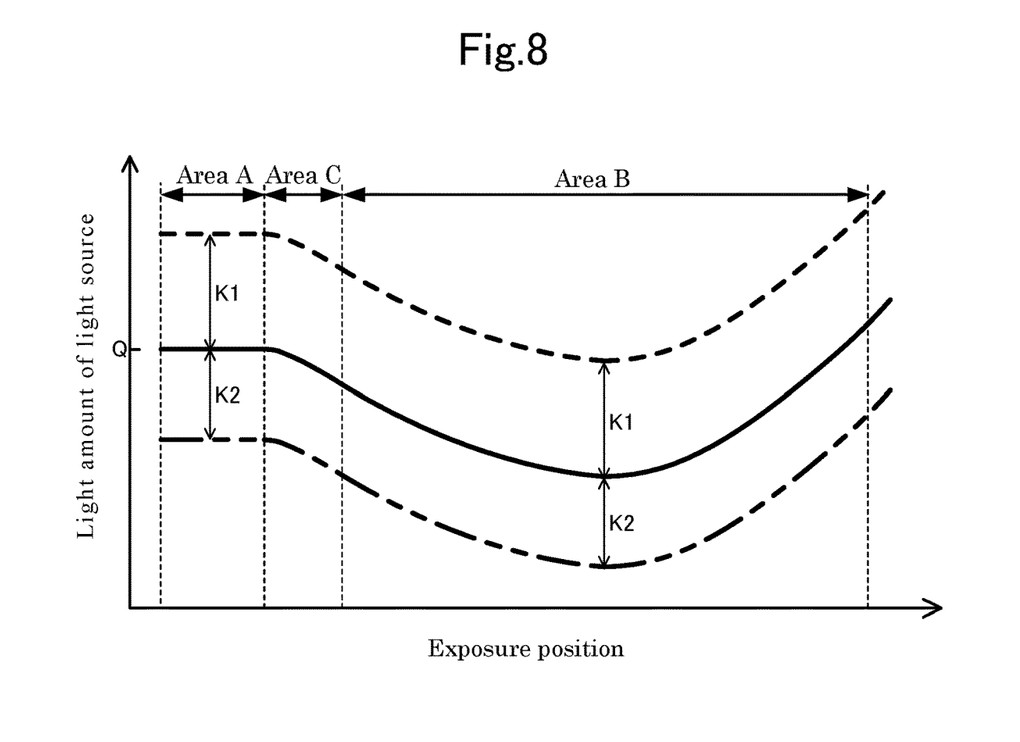
FIG. 8 is a view corresponding to FIG. 6, which illustrates a conventional example.

On the other hand, in the synchronization detection area A, the light amount is set to be constant (a change amount of the light amount according to a change in the scanning speed of light is 0) regardless of the target scanning speed of light. Consequently, for example, as illustrated in a conventional example of FIG. 8, as compared with a case where the light amount is allowed to be offset by the same amount in the synchronization detection area A and the image writing area B, it is possible to suppress a variation of the amount of light incident into the BD sensor 47. Thus, it is possible to improve detection accuracy of light by the BD sensor 47. Accordingly, a writing start timing of image data in each of the image forming units 10*a* to 10*d* is accurately controlled, so that it is possible to suppress image defects such as color shift occurring in a printed image.

Embodiment 2

Figure 7:
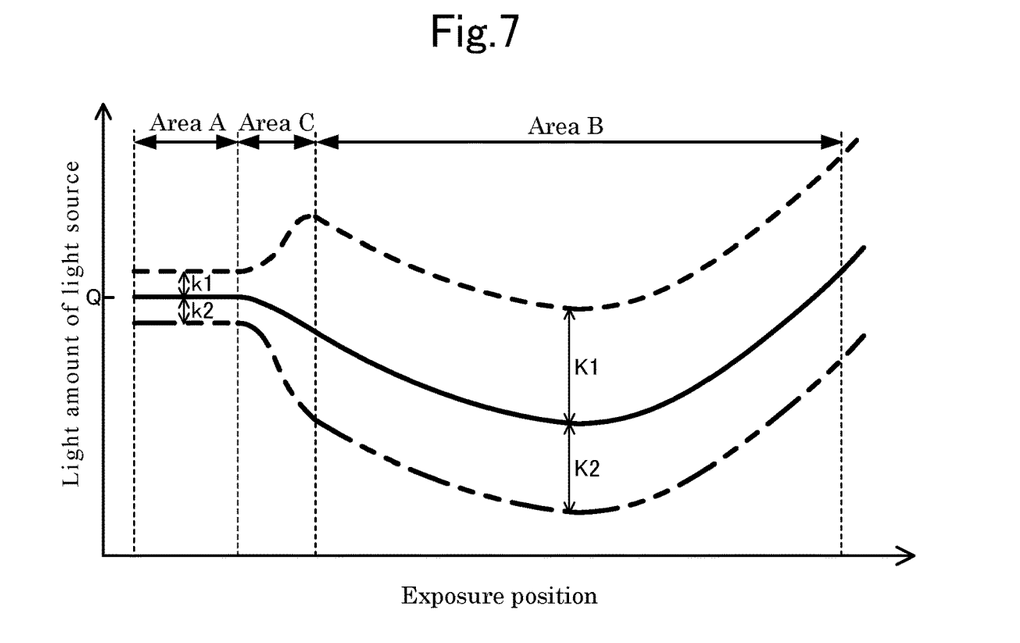
FIG. 7 is a view corresponding to FIG. 6, which illustrates an embodiment 2.

FIG. 7 is a view corresponding to FIG. 6, which illustrates an embodiment 2. In this embodiment, the content of the light amount change control in the synchronization detection area A is different from that of the aforementioned embodiment 1.

That is, in the present embodiment, in the synchronization detection area A, the light amount when the target scanning speed of light is the reference speed is employed as a reference, and the light amount of the light source 41 is allowed to be offset to the plus side or the minus side in accordance with the target scanning speed of light. That is, the offset amount is smaller than an offset amount (a change amount) of the light amount in the image writing area B. In the example of the graph of FIG. 7, when the target scanning speed is higher than the reference speed (in the case of a thick broken line of FIG. 7), the light amount of the light source 41 is allowed to be offset to the plus side by K1 and k1 with respect to a reference value (a thick solid line) in each of the image writing area B and the synchronization detection area A, so that a relation of k1<K1 is satisfied. Furthermore, when the target scanning speed is lower than the reference value (in the case of a thick two dot chain line of FIG. 7), the light amount of the light source 41 is allowed to be offset to the minus side by K2 and k2 with respect to the reference value (the thick solid line) in each of the image writing area B and the synchronization detection area A, so that a relation of k2<K2 is satisfied. A ratio R of the offset amounts in the synchronization detection area A and the image writing area B is constant. That is, in the example of FIG. 7, R=k1/K1=k2/K2.

According to the present embodiment, as compared with the case where the light amount of the light source 41 in the synchronization detection area A is allowed to be constant regardless of the scanning speed of light as with the embodiment 1, it is possible to reduce a change amount of the light amount of the light source 41 in the transition area C. Thus, an image formation time is shortened and a variation of the light amount of light incident into the BD sensor 47 is suppressed, so that it is possible to improve the accuracy of synchronization detection by the BD sensor 47.

When the aforementioned ratio R is excessively low, since the change amount of the light amount in the transition area C becomes large, a required time of the transition area C becomes long, so that an image formation speed is reduced. On the other hand, when the aforementioned ratio R is excessively high, since the variation of the light amount of light incident into the BD sensor 47 becomes large, the accuracy of synchronization detection by the BD sensor 47 is reduced. Consequently, it is preferable that the aforementioned ratio R, for example, is equal to or more than ¼ and is equal to or less than ⅓ in consideration of a balance of the both.

Other Embodiments

In the aforementioned each embodiment, the tandem type image forming apparatus has been described as an example of the image forming apparatus 1 including the optical scanning device 4; however, the present invention is not limited thereto. That is, the image forming apparatus 1 may include a monochromatic type image forming apparatus including only one optical scanning device 4. Furthermore, the image forming apparatus 1 is not limited to a printer, and for example, may include a copy machine, a facsimile, a multifunctional peripheral (MFP) and the like.

INDUSTRIAL APPLICABILITY

As described above, the present invention is available for an optical scanning device and an image forming apparatus including the same.

REFERENCE SIGNS LIST

A synchronization detection area
B image writing area
1 image forming apparatus
4 optical scanning device
11 photosensitive drum
30 intermediate transfer device
41 light source
44 polygon mirror (deflector)
47 BD sensor (synchronization detection sensor)
100 controller (light amount change unit, scanning control unit)

The invention claimed is:

1. An optical scanning device comprising:
   a light source that emits light;
   a deflector that deflects the light emitted from the light source and allows the deflected light to be scanned on a surface of a photosensitive drum;
   a synchronization detection sensor provided at a predetermined position of a scanning path of the light deflected by the deflector and outputting a reference signal of a writing start timing of image data to the photosensitive drum;
   a scanning control unit that controls a scanning speed of the light by the deflector in accordance with a printing condition; and
   a light amount change unit that changes a light amount of the light source such that the light amount of the light source is increased as the scanning speed of the light by the deflector is increased,
   wherein the scanning path of the light includes a synchronization detection area where the synchronization detection sensor detects scanning light and an image writing area where writing of the image data to the photosensitive drum is performed by the scanning light, and
   wherein the light amount change unit is configured to change the light amount of the light source such that the light amount of the light source is increased in both the image writing area and the synchronization detection area as the scanning speed of the light by the deflector is increased.

2. An image forming apparatus comprising the optical scanning device of claim 1.

* * * * *